(12) United States Patent
Henderson

(10) Patent No.: US 6,189,962 B1
(45) Date of Patent: Feb. 20, 2001

(54) VEHICLE TOP AND METHOD

(76) Inventor: James M. Henderson, 1252 11th St. NW., Hickory, NC (US) 28601

( * ) Notice: Under 35 U.S.C. 154(b), the term of this patent shall be extended for 0 days.

(21) Appl. No.: 09/373,519

(22) Filed: Aug. 13, 1999

(51) Int. Cl.[7] .......................................................... B60J 7/11
(52) U.S. Cl. ............................................ 296/218; 280/756
(58) Field of Search .................................... 296/218, 102; 280/756

(56) References Cited

U.S. PATENT DOCUMENTS

| | | | |
|---|---|---|---|
| 205,099 | * | 6/1878 | Jannopoulo . |
| D. 259,340 | | 5/1981 | Stengel . |
| D. 322,055 | | 12/1991 | Bruce et al. . |
| D. 393,827 | | 4/1998 | Taylor . |
| 1,670,422 | * | 5/1928 | Pierce et al. . |
| 2,785,002 | * | 3/1957 | Schumaker . |
| 2,795,458 | * | 6/1957 | Wieschel . |
| 4,049,294 | * | 9/1977 | Atherton . |
| 4,179,152 | | 12/1979 | Kent, Jr. . |
| 4,475,764 | * | 10/1984 | Hutchinson . |
| 4,538,752 | | 9/1985 | Welter . |
| 4,600,235 | | 7/1986 | Frederick et al. . |
| 4,757,854 | | 7/1988 | Rippberger . |
| 5,695,238 | * | 12/1997 | Calamari et al. . |
| 5,725,273 | * | 3/1998 | Vernon et al. . |
| 5,803,529 | | 9/1998 | Perry-Bores et al. . |
| 5,961,175 | * | 10/1999 | Clardy, Jr. . |
| 6,059,351 | * | 5/2000 | Ehnes . |

* cited by examiner

Primary Examiner—D. Glenn Dayoan
Assistant Examiner—Scott Carpenter

(57) ABSTRACT

The invention herein describes a light weight, one-piece top for a sports vehicle such as a Jeep-type vehicle having roll bars which surround the passenger compartment. The top is formed from a polymeric material and includes arcuate side sections which engage the roll bars to hold the top in place. A depending front flange engages the vehicle body proximate the windshield to prevent the top from lifting while driving.

17 Claims, 3 Drawing Sheets

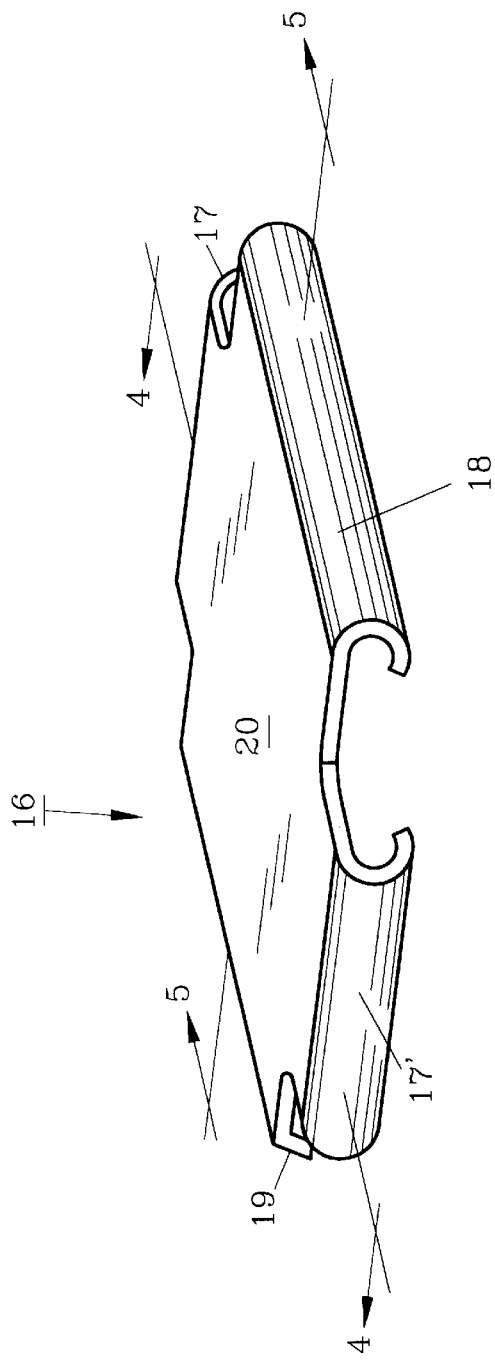
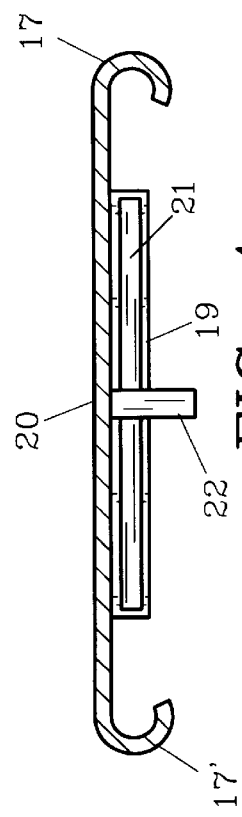
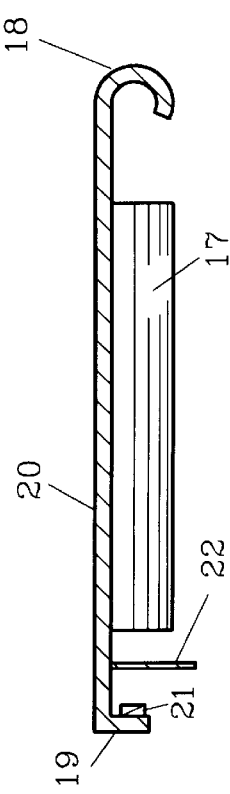
FIG. 3
FIG. 4
FIG. 5

VEHICLE TOP AND METHOD

FIELD OF THE INVENTION

The invention herein pertains to a top for removable attachment to the roll bars of an open passenger compartment type vehicle, and pertains particularly to a hard top for attachment to a Jeep-type vehicle.

BACKGROUND AND OBJECTIVES OF THE INVENTION

In recent years Jeeps and other type of sports vehicles have become increasingly popular. Most of these vehicles utilize an open passenger compartment which is surrounded by roll bars to protect the passengers in the event the vehicle is overturned. It is not unusual to attach a "soft" canvas or canvas-like material top to such vehicles which can be readily removed as desired. Also, certain manufacturers have created "hard tops" usually formed of metal which can be placed over the roll bars in the event of inclement weather. Both "hard" and "soft" type tops require a certain amount of labor and technique in attaching and removing, and oftentimes such tops are not properly secured. Many times vehicle occupants have found themselves becoming soaked with rain as such tops are not sufficiently secured. Additionally, such tops are often difficult for one individual to manipulate and attach. Thus, many times two people are required to affix or remove conventional hard and soft tops.

With the problems and disadvantages of such conventional vehicle tops known, the present invention was conceived and one of its objectives is to provide a light weight, one-piece vehicle top which is both easy to affix and remove by a single individual.

It is Still another objective of the present invention to provide a vehicle hard top which can be securely affixed without tools to the roll bars of a sports vehicle in a matter of minutes.

It is also objective of the present invention to provide a vehicle top which is inexpensive to manufacture and convenient for a single individual to easily learn to attach and release.

It is yet another objective of the present invention to provide a removable vehicle top which is formed of a durable, flexible polymeric material and is relatively light in weight and convenient to store when not in use.

It is further an objective of the present invention to provide a vehicle top which is simply attached by a series of integrally formed distortable arcuate sections along the outer edges.

Various other objectives and advantages of the present invention will become apparent to those skilled in the art as a more detailed description is set forth below.

SUMMARY OF THE INVENTION

The aforesaid and other objectives are realized by providing a sports vehicle top which is manufactured from a polymeric material such as polyethylene, polyvinyl chloride, polyester or other suitable materials, including composites. The top is formed such as by injection molding to form a substantially planar central section which may be 0.25–0.5 centimeters in thickness and having a length and width to conveniently span the open passenger compartment as defined by the upper roll bars of a selected vehicle. Along the sides and preferably the rear of the planar central section are arcuate sections, each forming an arc of one hundred eighty or more degrees. Along the front of the vehicle top, attached to the planar central section is a rectangularly shaped depending flange. The flange includes a sealing strip which helps seal the flange against the windshield. Also, a strap may be affixed to or near the depending flange, at the proximate lateral midpoint thereof for securement to a ring, usually provided interiorly on most sports vehicle windshields which are manufactured with roll bars to receive removable tops.

In use, an individual can manually lift the one-piece vehicle top and affix it to the roll bar on one side of the passenger compartment. Then, by pressing down on the upper surface of the top, the rear arcuate section flexes open an is forced over the rear passenger compartment roll bar. With continuing pressure, the rear and the opposite side roll bars are also engaged by the rear and third or opposite side arcuate sections. As the top is being so positioned, the flange along the front of the planar central section is likewise positioned against the exterior front of the windshield or windshield frame.

Thus, with the three arcuate sections each engaging separate roll bars and with the front flange firmly secured against the vehicle windshield, the vehicle is now ready for driving without fear of the top lifting or acting as a "wing" during high driving speeds.

BRIEF DESCRIPTION OF THE DRAWINGS

FIG. 3 depicts a perspective view of the top removed from the vehicle;

FIG. 4 pictures the top as shown in FIG. 3 along lines 4—4; and

FIG. 5 demonstrates the top of FIG. 3 shown along lines 5—5 therein.

DESCRIPTION OF THE PREFERRED EMBODIMENT AND OPERATION OF INVENTION

Figure 1:
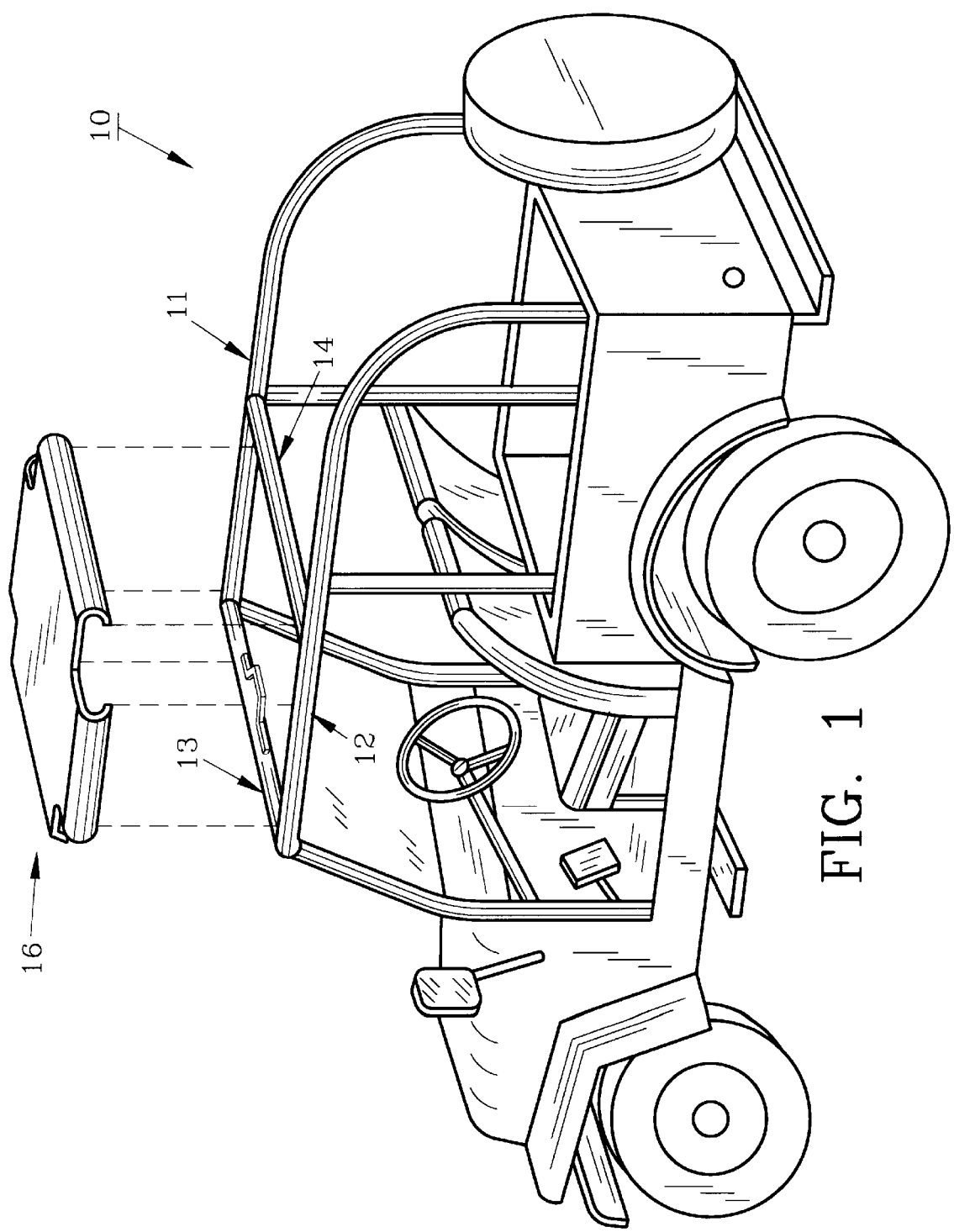
FIG. 1 illustrates a typical Jeep-type sports vehicle having roll bars surrounding the passenger compartment with the top exploded therefrom.

For a better understanding of the invention and its operation, turning now to the drawings, FIG. 1 features Jeep-type vehicle 10 having right side roll bar 11 and left side roll bar 12 joined by front roll bar 13 and rear roll bar 14 connected thereto as is conventional. Also as is standard, roll bars 11–14 may be covered by a fabric or foam covering. As would be understood, roll bars 11–14 are commonly used in various types of sports vehicles, especially of the Jeep-type as shown in FIG. 1, although such could be used on other types of vehicles as desired.

Shown above and exploded from vehicle 10 in FIG. 1 is preferred top 16 which has been injection molded as by conventional means. Top 16 is formed from a durable polymeric material such as polyethylene, polyvinyl chloride or other suitable materials and is shaped to be easily positioned on and removed from roll bars 11–14 manually by an individual without help or assistance.

Figure 2:
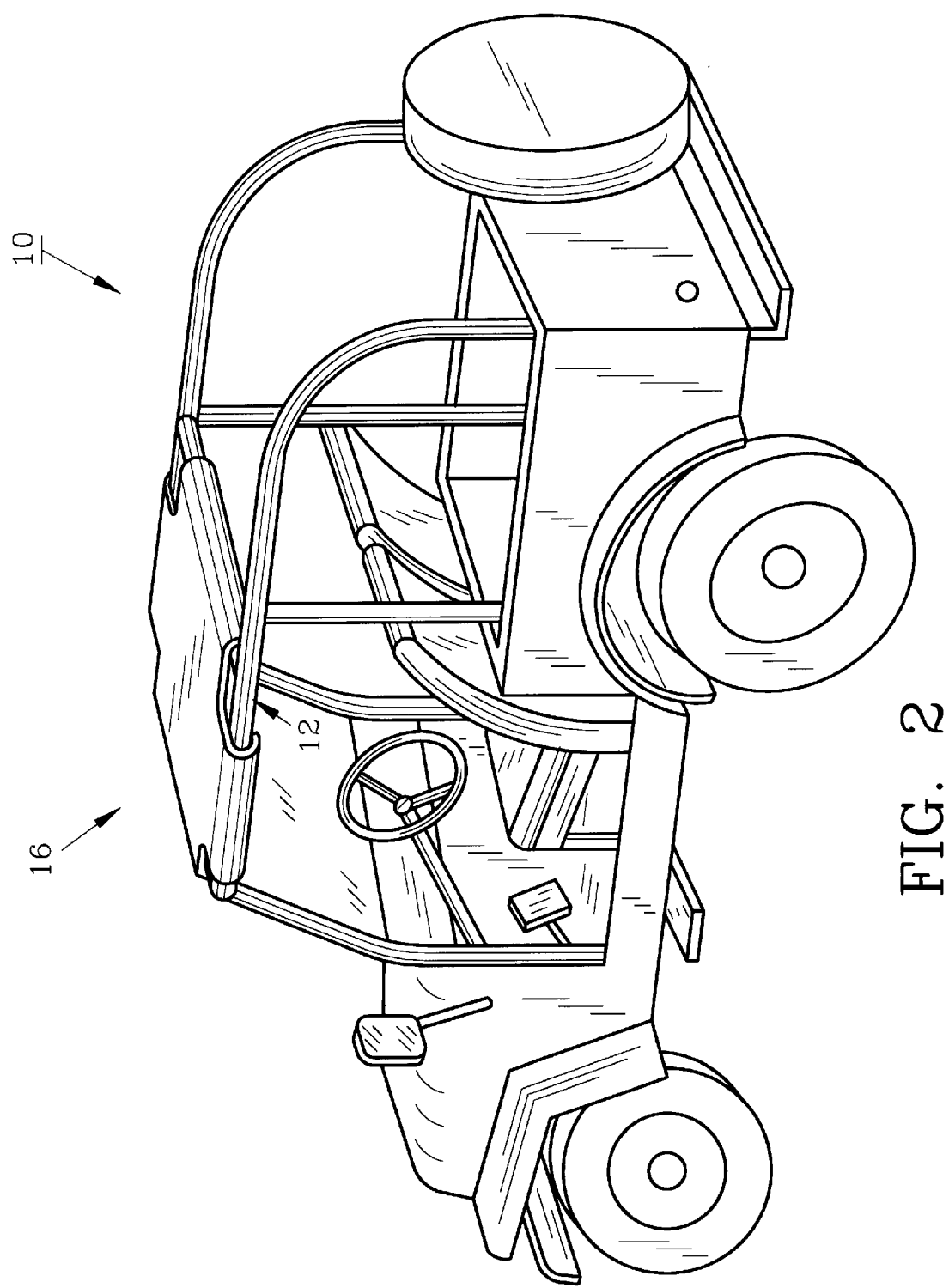
FIG. 2 demonstrates the vehicle as shown in FIG. 1 but with the top in place on the roll bars.

FIG. 2 demonstrates top 16 installed on vehicle 10 by one person since top 16 is relatively light in weight due to its composition, thickness and size. Top 16 may have a thickness of about 0.25–0.5 centimeters and a length and width suitable to accommodate the dimensions of particular roll bars 11–14 on vehicle 10.

As shown in FIG. 3, top 16 has a planar central section 20 with a pair of opposing arcuate first side sections 17 and second arcuate side section 17' which attach to roll bars 11, 12 respectively as seen in FIG. 1. In FIGS. 3, 4 and 5 arcuate sections 17, 17' and 18 each have an arc length of more than one hundred eighty degrees with an inner diameter slightly less than the outer diameter of roll bars 11, 12 and 14 to tightly engage the same. As top 16 is formed from a flexible polymeric material, during attachment, by manually pressing top 16 downwardly, arcuate side section 17, 17' and arcuate rear section 18 flex to "open" and "snap" over roll bars 11, 12 and 14 to hold top 16 in a stable condition for driving. Along the front of central planar section 20 is a downwardly depending flange 19, also integrally formed such as by injection molding with planar central section 20 of top 16. As shown in FIG. 5, flange 19 has attached interiorly thereto a foam rubber sealing strip 21 which provides a tight fit between flange 19 and windshield 23 as shown in FIG. 1. Sealing strip 21 may fit against the glass of windshield 23 or above the glass along the upper part of the windshield frame (not shown) in FIG. 1.

As shown in FIG. 4 flexible stabilizing strap 22 may be a conventional leather or fabric strap with a buckle for attachment to a ring found on certain Jeep-type vehicles proximate the middle, inside of the front windshield. Stabilizing strap 22 is affixed to planar central section 20 and may provide extra security in the attaching process of top 16, although it is generally not required.

The preferred method of positioning top 16 on vehicle 10 consists of, for example placing first arcuate section 17 on roll bar 11 and by using manual force on top 16, arcuate section 17 will open to fully engage roll bar 11. Next, top 16 is rotated around roll bar 11 whereby rear arcuate section 18 then contacts roll bar 14. Again by applying manual pressure, roll bar 18 is opened to be fully engaged along the length of arcuate section 18. As additional pressure is applied, second arcuate section 17' engages roll bar 12 in the same manner. Simultaneously therewith, flange 21 fits over the outside top edge of windshield 23 and is in firm, secure contact therewith. Stabilizing strap 22, if employed is now fastened in the provided ring. Top 16 is now in place and occupants of vehicle 10 can enjoy a shaded and protected "roof" for the passenger compartment.

In order to remove top 16, an individual can manually pull upwardly along one side of top 16, for example along arcuate section 17, and rear section 18, simultaneously if needed, to remove that side arcuate section and rear arcuate section 18 from roll bars 11 and 14 respectively. Next, arcuate section 17' is removed from the opposite roll bar (such as 12) by firmly grasping arcuate section 17' and pulling it upwardly, from roll bar 12. Of course if stabilizing strap 22 has been utilized, it is first unfastened. Top 16 is then ready for placement in the rear storage compartment of vehicle 10 or other storage area as desired.

The illustrations and examples provided herein are for explanatory purposes and are not intended to limit the scope of the appended claims.

I claim:

1. A top for attachment to vehicle roll bars comprising:
   a substantially planar central section, a first arcuate section, said first arcuate section affixed to said planar central section, said first arcuate section forming an arc greater than 180° whereby said first arcuate section will grip the roll bars to hold the top in place.

2. The top of claim 1 wherein said central section is formed from a polymeric material.

3. The top of claim 1 wherein said first arcuate section is integrally formed with said planar central section.

4. The top of claim 1 further comprising a second arcuate section, said second arcuate section attached to said planar central section along a side thereof opposite said first arcuate section.

5. The top of claim 1 further comprising second and third arcuate sections, said second and third arcuate sections attached to said planar central section.

6. The top of claim 1 further comprising a stabilizing strap, said stabilizing strap attached to said planar member for securing said top to the vehicle.

7. The top of claim 6 wherein said stabilizing strap comprises a flexible fabric strap.

8. The top of claim 1 further comprising a flange, said flange attached to said planar central section for contacting said vehicle proximate the windshield.

9. The top of claim 1 formed from polyethylene.

10. The top of claim 1 formed from polyvinyl chloride.

11. A removable top for attachment to the roll bars of a jeep-type vehicle, said top comprising a planar central section and a pair of arcuate sections, one of said arcuate sections forming an arc greater than 180°, said arcuate sections affixed on opposite sides of said planar central section.

12. The removable top of claim 11 formed from a flexible polymeric material.

13. The removable top of claim 11 further comprising a flange, said flange affixed to the front edge of said planar central section for engaging the vehicle proximate the front windshield.

14. A method of attaching a top formed from a flexible material having an arcuate section forming an arc greater than 180° to a vehicle having roll bars, comprising the steps of:
   a) placing the top on the roll bars; and
   b) forcing the arcuate section onto one roll bar to engage the same.

15. The method of claim 14 wherein placing the top on the roll bars comprises the step of manually lifting the top onto the roll bars.

16. The method of claim 14 wherein the step of forcing the arcuate section comprises the step of engaging a first roll bar with the first arcuate side section having an arc greater than 180° and subsequently engaging a second roll bar with a second arcuate side section.

17. The method of claim 14 further comprising the step of removing the top from the vehicle roll bars.

* * * * *